United States Patent [19]

Chomat et al.

[11] 3,911,962

[45] Oct. 14, 1975

[54] FIRE-RESISTANT FLEXIBLE TUBES

[75] Inventors: Max Chomat; Jacques Proriol, both of Lyon, France

[73] Assignee: Rhone-Poulenc S.A., Paris, France

[22] Filed: May 18, 1973

[21] Appl. No.: 361,573

[30] Foreign Application Priority Data
May 19, 1972 France .............................. 72.18057

[52] U.S. Cl. ................ 138/125; 138/132; 138/137; 138/DIG. 2
[51] Int. Cl.² .......................................... F16L 11/02
[58] Field of Search ........... 138/125, 127, 129, 132, 138/133, DIG. 2, DIG. 7, 144, 149, 141; 156/144; 98/2.05

[56] References Cited
UNITED STATES PATENTS

| | | | |
|---|---|---|---|
| 2,577,205 | 12/1951 | Meyer et al. .................... | 138/DIG. 2 |
| 2,674,297 | 4/1954 | Greenwald ..................... | 138/125 X |
| 2,733,176 | 1/1956 | Balis .............................. | 138/129 X |
| 2,740,427 | 4/1956 | Swan, Jr. ........................ | 138/133 X |
| 2,888,954 | 6/1959 | Gates .................................. | 138/137 |
| 3,002,534 | 10/1961 | Noland .......................... | 138/153 X |
| 3,245,431 | 4/1966 | Coe................................. | 138/123 X |
| 3,616,818 | 11/1971 | Case et al. ..................... | 138/129 |

OTHER PUBLICATIONS

Publication, Insulation/Circuits (List of Materials) June–July 1971, pp. 114, 119, 124, 129.

Primary Examiner—Richard C. Queisser
Assistant Examiner—Daniel M. Yasich
Attorney, Agent, or Firm—Cushman, Darby & Cushman

[57] ABSTRACT

A fire-resistant flexible tube, for example for conducting air to heat or air condition the interior of a vehicle, aircraft etc. The tube comprises at least one fabric woven from fibres of glass, polyimide-amide or polyimide, and a rigid supporting helix glued to the or each fabric, the helix being formed from a circular hollow braid of glass fibres, the braid having an external diameter of 0.8 to 1.8 mm, with or without a solid core of mineral fibres, the helix being stiffened by 5 to 35% by weight of a heat resistant resin of organosilicon or polyamide.

8 Claims, 6 Drawing Figures

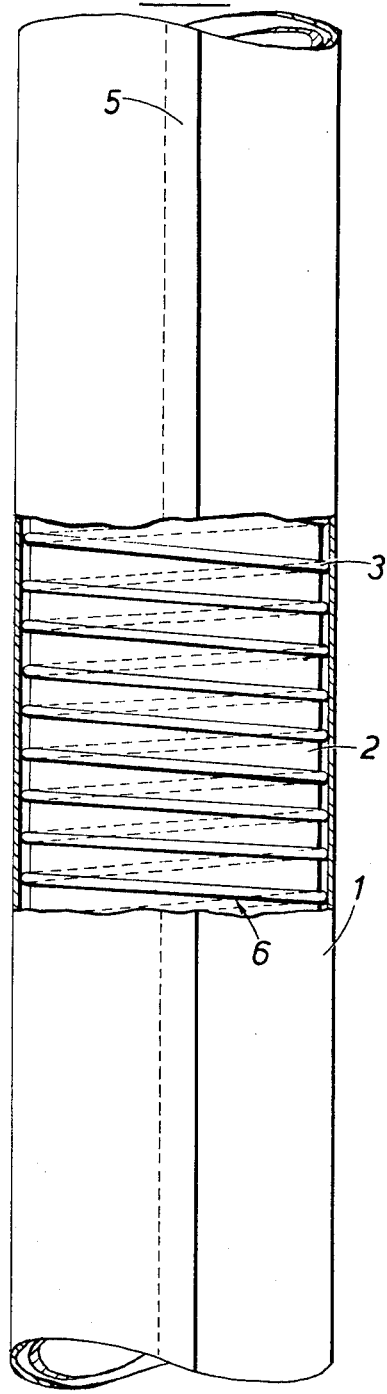
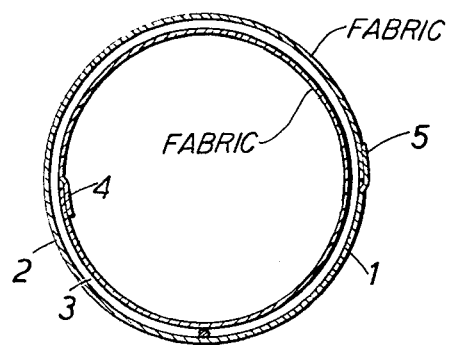
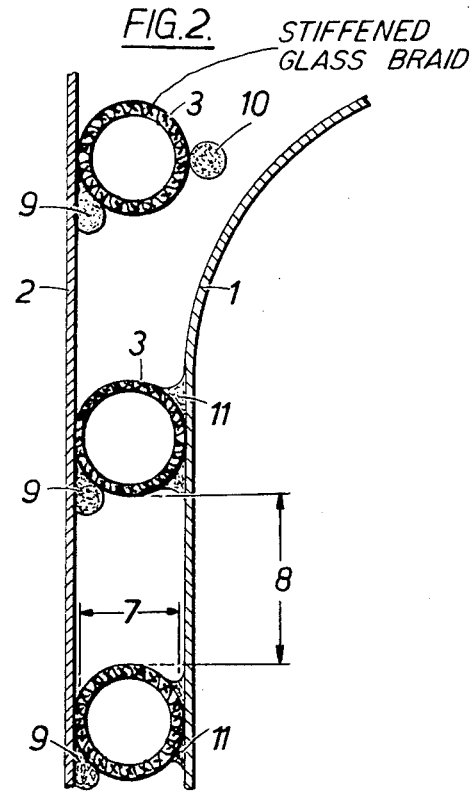

FIRE-RESISTANT FLEXIBLE TUBES

The present invention relates to fire-resistant flexible tubes, for example for use in conveying air or other gaseous fluids for conditioning the atmosphere inside modern vehicles.

The comfort provided by controlling the atmosphere inside vehicles has come into general use in railway carriages, public means of transport and hydrofoils among others. Furthermore, this control is essential in aircraft which fly at high altitudes, and in effect it serves to maintain an air pressure which is independent of variations in altitude and a substantially constant temperature in their cabin.

The tubes which are suited to this use are well known and the nature of the material employed depends on various factors, such as the weight in aircraft, the temperature of the fluid blown in and the rate of ventilation required.

It is also well known that in vehicles which possess conditioned air each passenger generally has at his disposal an injector which he can adjust as he pleases. Because of this, air conditioning circuits consist of a series of tubes of variable diameter, those which are connected to the injectors being of small diameter. Most frequently, these tubes must be able to withstand (for the test periods shown in the specifications of the manufacturers) temperatures of −55°C to +75°C, variations in pressure which range to a maximum of 250 millibars, longitudinal and lateral deformations without variations in the internal diameter, crushing effects of 80% of the diameter without permanent deformation and vibrations encountered in the vehicle in question.

With respect to the small tubes used in aircraft, they must generally be of the lowest possible weight, their specifications providing, as a maximum, a weight of 80 g/metre for an internal diameter of 38 mm and 100 g/metre for an internal diameter of 51 mm. The majority of these tubes are manufactured by using common materials such as woven fabrics coated with plastics (polyvinyl chloride and conventional or aromatic polyamides) and stiff, strong bristles which are glued at the periphery of the tubes in order to stiffen them. These plastics are preferably self-extinguishing either by their nature or through the incorporation of flameproofing agents.

Furthermore, other types of tubes are also used in industry and they consist of a helicoidal metal frame covered with woven fabrics of glass fibres coated with polymers which are resistant to heat, such as silicones. The tubes which are self-extinguishing must meet the tests laid down by the standard specifications in force, such as those edited by the "Department of Transportation" of the F.A.A. of the United States, particularly the Federal Aviation Regulation, Part 25, Appendix F Amendment 25–32 (paragraphs 25,853 - Amendment 17,25.855 and 25.1359).

However, more severe standard specifications, published recently or under consideration, lay down that the materials used must be resistant to a flame of 850°C for 60 seconds and must evolve only very small amounts of non-toxic gases and fumes during their pyrolysis (NPRN 6933 of docket 9605 and draft docket 9611 according to notice 6930 of 30th July 1969).

According to the present invention we provide a fire-resistant flexible tube comprising at least one fabric woven from fibres of glass, polyimide-amide or polyimide, and a rigid supporting helix glued to the or each fabric, the rigid helix being formed from a circular hollow braid of glass fibres, the braid having an external diameter of 0.8 to 1.8 mm and being stiffened by a heat-resistant resin of organo-silicone or polyimide the weight of the heat-resistant resin being 5 to 35% of the weight of the braid.

If desired, a solid core of mineral fibres may be located within the circular hollow braid of the rigid helix, the mineral fibres being stiffened by a heat resistant resin of organo-silicon or polyimide the weight of the heat-resistant resin being 5 to 35% of the weight of the braid.

In one embodiment the tube comprises two woven fabrics, wherein one of said woven fabrics is surrounded by said rigid helix and the other of said woven fabrics surrounds said helix.

In another construction, the tube comprises a single woven fabric, wherein said woven fabric is surrounded by said supporting helix.

In order that the invention may more readily be understood, the following description is given, merely by way of example, reference being made to the accompanying drawings, in which:

FIG. 1 is a transverse cross-section through one embodiment according to the invention;

FIG. 2 is an enlarged scrap longitudinal section of the tube of FIG. 1;

FIG. 3 is a side elevation, with part broken away and showing a section of the tube of FIG. 1.

Figure 6:
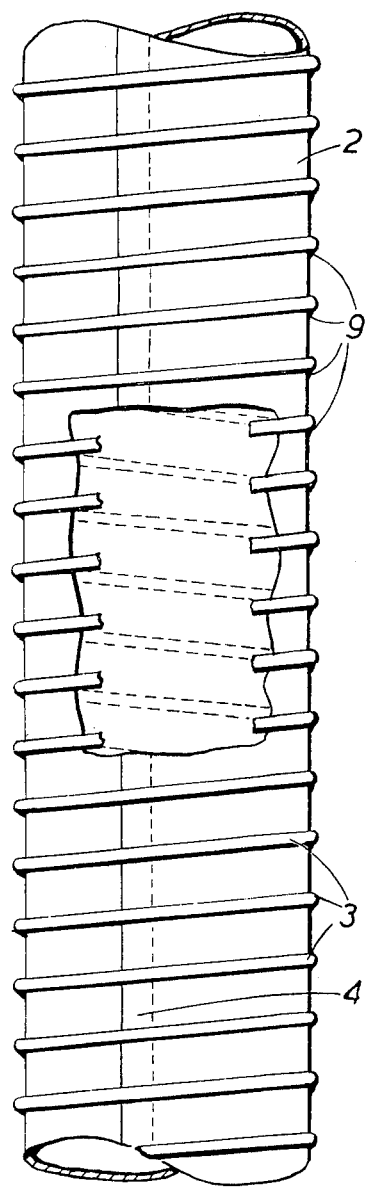
FIGS. 4, 5 and 6 are views similar to FIGS. 1, 2 and 3, respectively, of a second embodiment.

The tube shown in FIGS. 1, 2 and 3 comprises first woven fabric 2 which can be based on glass fibres, weighing 50 to 100 g/m² for a thickness at most equal to 1/10 mm, its strength in the direction of the warp being 12 to 20 kg/cm and in the direction of the weft being 10 to 22 kg/cm, coated to the extent of 10 to 50 g/m² with a self-extinguishing silicone elastomer vulcanised under hot conditions or at ambient temperature. This woven fabric can also be based on polyimide-amide or on polyimide fibres weighing 60 to 120 g/m² for a thickness at most equal to 15/100 mm.

A compressible rigid supporting helix 6 surrounds the fabric 2, the diameter of the helix being a function of the internal diameter of the tube to be produced, the spacing 8 between successive turns of the helix being between 2 and 8 mm. Surrounding the helix is a second woven fabric 1, similar to the fabric 2, and coated with the same compounds.

The helix is formed from one or more hollow braids 3 of glass fibres or from a solid, gauged core of mineral fibres such as asbestos, surrounded by a braid of glass fibres. These materials are chosen because they can be impregnated easily with stiffening resins and are self-extinguishing; it is important that, after crosslinking, these resins shall be hard and shall give the helix the characteristics of a spring.

Polyimide resins such as those described in French Pat. Nos. 1,365,545 and 1,555,564 and silicone resins such as those described in French Pat. No. 1,568,812 are particularly suitable. These resins can be used directly or dissolved in the usual solvents. Before coating with the above-mentioned resins, it is preferable to deposit and cure, on the starting materials in the form of strands, which lead to the spirals, organic impregnation resins such as epoxy resins or mixed organic/organometallic resins such as alkyd/silicone resins, for the purpose of giving the strands a certain strength and thus preventing them from sagging when they are wound up on mandrels.

The helices are shaped separately on a mandrel of suitable diameter covered with a thin film of a non-stick material which resists the stoving temperature of the resins, such as polyethylene terephthalate, polytetrafluoroethylene and organosilicon polymers. The strands 7 of a diameter of 0.8 to 1.8 mm impregnated with the chosen resin which has not been cured, are then attached at one end of the mandrel (the latter being mounted on a lathe which turns at a suitable speed) and are then wound up on the mandrel by an ordinary carriage, the forward movement of which is adjusted in order that the turns of the helix should have the desired spacing 8. According to a variant, coating with the resin to the extent of 5 to 35% of the weight of the strands can take place once the strands are wound up on the mandrel.

The mandrel, with the coated helix wound around it, is then removed from the lathe and placed in a ventilated oven where it remains for the necessary time for complete cross-linking of the resin, the curing temperature being within the range 100° to 300°C. After stoving, the helix is removed from the mandrel and it possesses the characteristics of a spring, and in particular, is compressible and strong.

The first woven fabric 2 which forms the internal wall of the tube coated with an organosilicon elastomer, is wound up on itself around a making-up mandrel in such a way that it overlaps parallel to the axis of the tube over a width 4 which can vary from 3 to 15 mm, glueing being effected, for example, by means of the coating elastomer. The coating elastomers can be of the type which are vulcanized hot such as those mentioned in French Pat. Nos. 1,382,285 and 1,541,085, of the type vulcanized at a rather low temperature such as those mentioned in French Patents 1,301,874 and 1,314,679 and of the type vulcanized at ambient temperatures such as those mentioned in French Pat. Nos. 1,188,495, 1,198,749 and 2,067,636. In order to increase the resistance to fire of these elastomers, it is sometimes useful to incorporate, into their curable base compositions, special fillers such as carbon black which is free from sulphur, pyrogenic titanium oxide, magnesium oxide or ceric oxide, together with — if these compositions do not already contain any — a platinum derivative (French Pat. Nos. 2,051,792 and 2,055,103). However, with the compositions which can be cured at ambient temperature, it is often preferable to use conventional flameproofing fillers such as arsenic, antimony and bismuth oxides, oxyhalides and halides and halogenated hydrocarbons (French Pat. No. 2,014,678).

A helix is slipped over the coated fabric which is wound up around the mandrel and then, by means of pneumatic equipment, a band 9 of diameter 0.3 to 0.6 mm of an organosilicon composition which vulcanizes at ambient temperature can be extruded via a cannula along the entire length of the helix in one and the same side as the latter, using the same lathe as that used to produce the helix and with a carriage having the same rate of forward movement. The lathe is then stopped until the vulcanisation, at least on the surface, of the organosilicon composition deposited. It is possible to restart the lathe and, by means of the abovementioned pneumatic equipment, to extrude a further band 10 of the same composition, but this time along the upper generatrix of the helix.

The second woven fabric 1, coated in the same way as the first one described above, is then placed over the mandrel, overlapping itself at 5 along a generatrix of the tube. During this operation, which can be carried out by means of a cylinder mounted on the carriage of the lathe, the band 10 is crushed by the second fabric and assumes a flattened cross-section 11. The presence of the band thus ensures the continuous gluing of the helix 6 onto the two woven fabrics.

According to a modification of the invention, the second woven fabric can be replaced by a sheet of an organosilicon composition which cures hot, and in this case it is not necessary to deposit glue on the strands; in effect, by simply applying pressure, this sheet adheres to the first coated glass fabric and to the helix and hence the latter is tightly held.

The mandrel carrying the tube is then placed in an oven, the temperature of which is within the range of 100 to 200°C for the time necessary for the vulcanisation of the organosilicon polymers used. The dwell time depends on the diameter of the tube but in general it barely exceeds 30 minutes.

The tubes thus produced have the appearance represented in FIG. 3, in which the woven fabrics 1 and 2 have been partially cut. Their external diameter is generally between 20 and 100 mm and their weight does not exceed approximately 150 g/metre of length.

Figure 4:
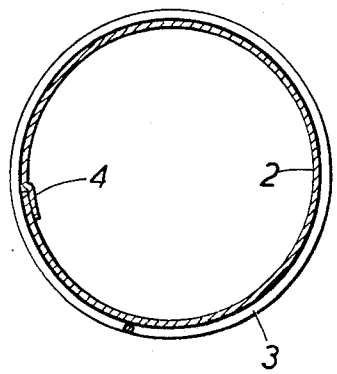
Figure 5:
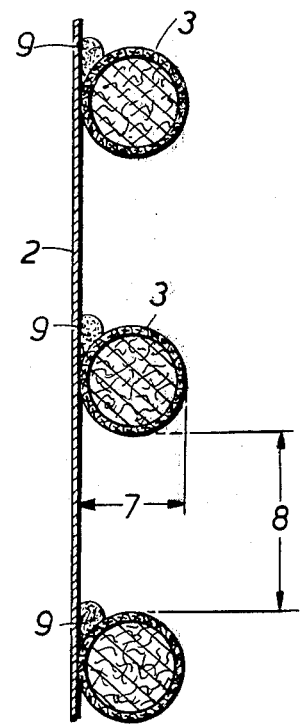

It is also possible to dispense with the second woven fabric 1 as shown in FIGS. 4, 5 and 6. However, in order to reinforce the external walls, it can be advantageous to deposit on them one or more layers of the organosilicon compositions already mentioned.

Other hollow materials having the properties of the tubes which have just been described but possessing a square or rectangular cross-section or any other shape desired by the manufacturer, can be manufactured by following the same technique, it being only necessary to work with a mandrel which has the corresponding shape.

The following examples are intended to illustrate the invention.

EXAMPLE 1

A circular hollow braid of silicone glass fibres, of diameter 13/10 mm, is impregnated as soon as it is braided to the extent of 18% of its weight with a conventional epoxy resin prepared from epichlorohydrin and bis-(hydroxyphenyl)-dimethylmethane. The braid, which is still circular, passes immediately through a vertical furnace heated to 180°C, at the speed of the braiding. On issuing from the furnace, it is sufficiently stiffened to be wound up without deformation on a wheel. It now weighs 2.15 g/metre and its diameter is approximately 15/10 mm.

This braid is then impregnated continuously with a 20% strength solution, in N-methylpyrrolidone, of a heat-resistant resin resulting from the reaction of 15 parts of N,N'-4,4'-diphenylmethane-bis-maleimide with 8.29 g of bis-(4-amino-phenyl)-methane.

A mandrel in the form of an aluminium tube of external diameter 50 mm and of length 60 cm is placed on a lathe. It is covered with a 50 micron thick polytetrafluoroethylene film, glued to itself by means of a silicone contact adhesive. This adhesive is a 50% strength solution, in trichloroethylene, of an organisilicon composition prepared by heating, under reduced pressure in order to remove the toluene, the following constituents:

- $\alpha,\omega$-Di(hydroxy)dimethylpolysiloxane oil of viscosity 1 million cPo at 25°C — 281 g
- 60% strength by weight solution, in toluene, of a resin consisting of $(CH_3)_3SiO_{0.5}$ and $SiO_2$ units taken respectively in the numerical ratio of 0.75/1 — 531 g
- O,O-tertiary butyl and O-isopropyl percarbonate — 10 g
- toluene — 188 g Starting from one end of this tube, the "braid" defined above is wound up, with a pitch of 8 mm and at the rate of 20 revolutions/minute, on the tube, by means of a carriage of the lathe, until the other end of the tube is reached. The braid is cut and its ends are attached to the tube by a metal collar.

The mandrel/helix combination is removed from the lathe and placed for 1 hour in a ventilated oven set at a temperature of 250°C.

After cooling to ambient temperature, the stiffened helix is separated from the sheathed metal tube. This helix possesses a very marked "spring" effect, and the distance between turns is no more than 7 mm and its weight is 2.33 g/metre.

A woven fabric of silicone glass fibres, of thickness 8/100 mm, weighing 87 g/m², is then knife-coated over a surface area of 25 × 45 cm with a self-extinguishing crude elastomer dispersion in such a way that the fabric retains in weight approximately 30% of the elastomer after evaporation of the solvent at 120°C for 10 minutes.

This crude silicone elastomer dispersion consists of a 25% strength solution, in toluene, of a composition comprising:

- 100 parts of diorganopolysiloxane rubber consisting of 99.8% of $(CH_3)_2SiO$ units and 0.2% of $(CH_3)CH_2\!\!=\!\!CH\!-\!SiO$ units, blocked at each end by a $(CH_3)_3SiO_{0.5}$ unit, of viscosity 25 million cPo at 25°C,
- 26 parts of pyrogenic silica treated with octamethylcyclotetrasiloxane,
- 1 part of an $\alpha,\omega$-di(hydroxy)dimethylpolysiloxane oil of viscosity 40 cPo at 25°C, containing 13% by weight of hydroxyl groups,
- 1.3 parts of tertiary butyl perbenzoate,
- 0.8 part of a 50% strength by weight dispersion of 2,4-di-chloro-benzoyl peroxide in a dimethylpolysiloxane oil of viscosity 1,000 cPo at 25°C,
- 6 parts of calcined magnesia and
- 0.0035 part of platinum in the form of a 0.5% strength by weight solution of $H_2PtCl_6\cdot 6H_2O$ in isopropanol.

The piece of fabric now weighs 11.58 g. It is wound up on the mandrel in such a way that it covers a length of 45 cm and that it can be glued to itself over a strip of width 5 mm along a generatrix of the mandrel, the excess being then cut off. This overlap requires a width of 16.4 cm of fabric and its residual weight is 7.6 g.

A 45 cm length of the helix described above is then slipped over the glass fabric in such a way that the distance between turns is 7 mm. This distance is produced by passing a template between the turns whilst causing the mandrel to revolve slowly. The two ends of the helix are then attached by collars onto the mandrel.

On a calender, on a 50 micron thick polyethylene terephthalate film, there is drawn a sheet, of thickness 0.3 mm, of self-extinguishable crude elastomer having the following composition:

- 100 parts of diorganopolysiloxane rubber consisting of 99.7% of $(CH_3)_2SiO$ units and 0.3% of $(CH_3)CH_2\!\!=\!\!CH\!-\!SiO$ units, terminated at each end by a $(CH_3)_2CH_2\!\!=\!\!CH\!-\!SiO_{0.5}$ unit, of viscosity 10 million cPo at 25°C,
- 10 parts of ground quartz,
- 45 parts of pyrogenic silica of specific surface area 200 m²/g,
- 3 parts of diphenylsilanediol,
- 9 parts of an $\alpha,\omega$-di(hydroxy)dimethylpolysiloxane oil of viscosity 40 cPo at 25°C, containing 13% by weight of hydroxyl groups,
- 1.7 parts of a 50% strength by weight dispersion of 2,4-dichloro-benzoyl peroxide in a dimethylpolysiloxane oil of viscosity 1,000 cPo at 25°C,
- 0.6 part of ferric oxide,
- 15 parts of ceric oxide and
- 0.0025 part of platinum in the form of a 0.5% strength by weight solution of $H_2PtCl_6\cdot 6H_2O$ in isopropanol.

The sheet drawn off, of dimensions 45 cm × 16.5 cm, is placed on a table. The mandrel, having the coated glass fabric and the helix in position, is placed at one of its ends, in the lengthwise direction.

By pulling the plastic film gently, the elastomer is detached from the film and is pressed with a finger onto one of the generatrices of the cylinder. This rotation on the table is carried out until the sheet of elastomer overlaps itself over a strip of width 5 mm.

The mandrel thus coated is then placed on a table onto which there has been placed beforehand a readily compressible felt which can be either of a silicone cellular elastomer of density 0.3, or of oriented polyester fibres such as can be obtained commercially for backing cloths for ironing.

By being rotated on this felt, the sheet of elastomer comes to rest, on the one hand, on the outer edges of the helix and, on the other hand, becomes stuck to the coated glass fabric. When this operation is complete, the mandrel and its associated assembled parts are placed in a ventilated oven set at 150°C for 15 minutes.

After cooling to ambient temperature, the assembled parts are removed as a unit without difficulty from the mandrel.

The two ends of the tube are then cut in such a way that the residual length of the tube is 42.5 cm.

The portion of tube now weighs 51.5 g and consists of:

- 7.2 g of coated glass fabric;
- 17.6 g of braid wound into a helix with a spacing of 7 mm between turns, for a total of 48 and a half turns; and
- 26.6 g of vulcanized elastomer sheet.

The tube of the same composition and manufactured by the same process then has the following weight per metre:

- 121 g. consisting of:
  - 17 g of glass fabric
  - 41.4 g of helix; and
  - 62.6 g of elastomer.

This tube can be handled without its internal diameter varying. If it is compressed perpendicularly to its axis by 70% of its diameter, it returns to its original position as a result of the "spring" effect of the helix.

This tube is practically non-inflammable; when heated strongly it evolves very small and non-toxic amounts of fumes and gases, and fulfills the tests laid down on the one hand by the abovementioned Standard Specification NPRM 6933 relating to non-inflammability, and on the other hand fulfills Standard Specification NPRM 6930, also mentioned above, relating to the evolution of small and non-toxic amounts of fumes and gases.

EXAMPLE 2

A stiffened helix is produced in the following way.

A gauged core of white chrysolite asbestos, weighing 2.5 g per metre and of diameter 13/10 mm, containing 90% of fine 2-strand asbestos filaments and 10% of silionne glass filaments, is covered with a tight braid also of silionne glass filaments, bringing its diameter to 15/10 mm and its weight to 3.80 g/metre. It is continuously impregnated by immersion in a 45% strength solution of a silicone/alkyd resin produced in the following way:

22 parts of glycerine and 32 parts of isophthalic acid are mixed and heated to 200°C, with removal of water as it is formed; 5 parts of a mixture of linseed fatty acids of average molecular weight 280 are then added, removing the water again by heating to about 225°C. In a second stage, 6 parts of xylene, 18 parts of the methyl monoether of ethylene glycol and 10 the of trisiloxane of the formula

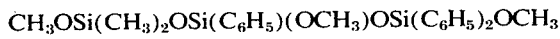

$CH_3OSi(CH_3)_2OSi(C_6H_5)(OCH_3)OSi(C_6H_5)_2OCH_3$ are introduced, and the whole is heated under reflux, in the presence of 0.1 part of butyl titanate so as to drive off, by distillation, all of the methanol formed. A sufficient amount of a mixture based on xylene and on the methyl monoether of ethylene glycol, respectively in the ratio by weight of 6/18, is added to the product obtained in order to have a 45% strength solution of mixed resin.

The impregnated braided core passes through a vertical furnace, of height 8 m, at a speed of 1 m/minute, the temperatures of the furnace being set as follows: lower third 90/120°C, middle third 150°C and upper third 160°C.

This impregnated gauged core is attached by a metal collar to one end of a mandrel consisting of an aluminium cylinder of external diameter 50 mm and of length 60 cm, covered with a sheet of polyethylene terephthalate of thickness 50 microns, the whole being mounted on a lathe revolving at 40 revolutions/minute, the carriage moving forward at the rate of 300 mm/minute. The carriage carries a 2 mm die through which the braided, impregnated core passes. It thus forms a helix with a pitch of 5 mm. After 70 revolutions, the core has reached the other end of the mandrel where it is attached by a new collar and cut. The lathe is started up again and the helix is brush-coated with 29% of its weight of a silicone resin without a solvent, described in part A of Example 1 of French Pat. No. 1,568,812. The lathe is stopped again and the mandrel/helix combination is bound with a tape of polyethylene terephthalate. The same combination is removed from the lathe and heated to 190°C in a ventilated oven where it remains for 4 hours.

After returning to ambient temperature, the binding is taken off and the helix is removed from the mandrel without difficulty. When free, the helix has a length of 55 cm, 67 turns and a weight of 54 g, which corresponds to 4.9 g/metre of turn or 122 turns to the metre for a weight of 99 g. This flexible helix has the characteristics of a spring.

If the helix is stretched or compressed, it returns to its equilibrium position, which corresponds to a pitch of 5 mm, and does so without variation in diameter.

A woven fabric of silicone glass fibres, of thickness 8/100 mm, weighing 87 g per square metre, which has been desized and measures 55 cm in length and 16.5 cm in width, is placed on the above mandrel which is still covered with a polyester film. This woven fabric has been knife-coated beforehand to the extent of 40 g/m² with the following composition:

75 parts of a dimethylpolysiloxane oil blocked by dimethylvinylsiloxy units, of viscosity 90,000 cPo at 25°C;

5 parts of a polymer of $SiO_2$ and $(CH_3)_2HSiO_{0.5}$ units, taken respectively in the numerical ratio of 1/2;

25 parts of a polymer of $(CH_3)_3SiO_{0.5}$, $(CH_3)CH_2=CHSiO$ and $SiO_2$ units, taken respectively in the numerical ratio of 3/0.4/3;

55 parts of ground quartz of average particle diameter 5 microns; and 0.002 part of platinum in soluble form in octyl alcohol.

The woven fabric is placed on the sheathed mandrel in the direction of its length and in such a way that it overlaps on itself by a width of 5 mm when wound around the mandrel. The overlapping surfaces are pressed by means of a little polyethylene roller. Its weight is 12 g.

The helix, also of length 55 cm, is then slipped over the mandrel covered with the coated fabric and is again fixed at each end by collars.

The mandrel is put back on the lathe but its rotational speed is reduced to 15 revolutions/minute, the carriage retaining its forward movement of 300 mm/minute; a cylindrical metal box, of useful capacity 1,000 cm³, having a polyethylene piston at one end and an outlet nozzle at the other end, is attached to the carriage. This nozzle is of the shape of a truncated cone and is made of polyethylene. Its end has been cut in order that it delivers a band of diameter 0.4 mm when an air pressure of 2 kg/cm² is applied to the piston of the cylinder. This cylindrical box has been filled beforehand, under nitrogen, with the following composition (by weight):

100 parts of an α,ω-dihydroxydimethylpolysiloxane oil, of viscosity 20,000 cPo at 25°C;

8 parts of a pyrogenic silica treated with octamethylcyclotetrasiloxane; and 3 parts of methyltriacetoxysilane.

The tip of the nozzle is positioned in such a way that it runs along the helix as the lathe rotates.

This band of diameter 0.4 mm flows by gravity. The lathe is left to revolve when the nozzle has reached the end of the helix and is so left for ¼ hour, after which time the elastomer is slightly vulcanized and sticks the helix to the woven fabric, as is shown in FIG. 2 and FIG. 5 (bead 9). The amount of "glue" used is 2.42 cm³, corresponding to 2.67 g, for a 55 cm length of spiral containing 67 turns. This corresponds to 4.85 g of glue per metre of helix.

The same operation is repeated with the same "glue" on the same lathe, but the band of thickness 0.4 mm is deposited on the outer generatrix of the helix. The total weight left is 2.7 g.

A second glass fabric, identical to the first and knife-coated with the composition described above for coating the first fabric to the extent of 42 g/m² is then wound around the tube, in the direction of its length, tangentially to the helix. However, its width is 19 cm so that the transverse overlap is 10 mm.

This second fabric, the weight of which is 12.7 g, is then pressed against the helix by means of a wooden roller equipped with a sheet of polyethylene of thickness 50 microns, kept parallel to the tube by being attached to the carriage of the lathe still moving forward at the rate of 300 mm/minute, the lathe revolving at 15 revolutions/minute. This operation makes it possible to glue the second fabric onto the helix by crushing the second band of glue as is shown in FIG. 2 (bead 11). The lathe is stopped after 12 seconds (3 revolutions of the cylinder).

The covered tube is then bound with a tape of thickness 25 microns and of width 50 mm, wound up into a helix, the tape being of polyethylene terephthalate.

The whole is removed from the lathe and placed in a ventilated oven at 150°C for 15 minutes. After it has returned to ambient temperature, the binding is taken off and the tube is removed from the mandrel. g of It possesses the same properties as that of Example 1. It weighs 84 g for an internal diameter of 50 mm and a length of 55 cm, the weight being broken down as follows:

|  | Length 55 cm | 100 cm |
| --- | --- | --- |
| 1st fabric | 12 g | 22 g |
| Helix braid | 54 g | 91 g |
| 2 "gluings" | 5.4 g | 9.7 g |
| 2nd fabric | 12.7 g | 23.4 g |
| TOTALS | 84.1 g | 146.3 g |

This tube fulfils the tests laid down by the abovementioned Standard Specifications NPRM 6930 and 6933.

EXAMPLE 3

A stiffened helix is produced from a hollow glass braid exactly as described in Example 1. This tubular helix has a diameter of 15/10 mm and weighs 2.33 g per metre, but the length of this helix in the equilibrium state is only 365 mm with a pitch of 5 mm between turns and its internal diameter is 48 mm.

The aluminium mandrel covered with a sheet of polytetrafluoroethylene of thickness 50 microns, described in Example 1 and having an external diameter of 50 mm and a length of 60 cm, is used again and placed on the same lathe.

A desized woven fabric of silicone glass fibres, of the poplin variety, of thickness 8/100 mm, weighing 90 g/m² and having a strength in the direction of the warp of 98 kg and in the direction of the weft of 106 kg over a strip of width 5 cm, is knife-coated on one face with the following composition, the parts being by weight:

90 parts of a dimethylpolysiloxane oil blocked by dimethylvinylsiloxy units, of viscosity 3,200 cPo at 25°C;

4.5 parts of a polymer of $SiO_2$ and $(CH_3)_2HSiO_{0.5}$ units, taken respectively in the numerical ratio of 1/2;

10 parts of a polymer of $(CH_3)_3SiO_{0.5}$, $(CH_3)CH_2=CHSiO$ and $SiO_2$ units, taken respectively in the numerical ratio of 3/0.4/3;

55 parts of ground quartz of average particle diameter 5 microns; and 0.002 part of platinum in the soluble form in octyl alcohol, in such a way as to leave 30 g/m² of this composition.

A surface area of length 360 mm and of width 170 mm is cut out of this coated fabric. It is placed on the protected mandrel, with its coated face on the side of the mandrel, in the direction of its length, whilst overlapping by about 10 mm. Its weight is 7 g, consisting of 5.3 of glass and 1.7 g of elastomer. The overlapping surface is coated with a 75% strength solution, in cyclohexane, of the "glue" described in Example 2 and used for attaching the helix to the two surrounding coated glass fabrics.

The mandrel is then removed from the lathe and the helix is slipped over the fabric, one of its ends being fixed by means of a collar.

The whole is put back on the lathe which revolves at 20 revolutions/minute and a template is placed on the carriage which moves forward at 300 mm/minute in order to separate the turns in such a way that the distance between them changes from 5 mm to 7.2 mm. The second end of the helix is then blocked by another collar. There are now 40 turns over the length of 360 mm.

Using a so-called water-colour painter's bevelled brush, with an effective length of 15 mm, the elastomer described above is passed over each side of each turn to touch the fabric.

The whole is removed from the lathe and heated to 150°C in an oven.

After cooling in air, the whole is put back on the lathe which revolves at 15 revolutions/minute. A solution comprising 40 parts by weight of the composition described above for coating the glass fabric and 60 parts by weight of cyclohexane is sprayed, by means of a spray gun operated by compressed air, onto the coated fabric/helix combination.

The lathe is stopped and the covered mandrel is placed in a ventilated oven for 5 minutes at 110°C and for 10 minutes at 150°C.

After cooling, the covered mandrel is put back on the lathe for a second identical spray coating followed by the same stoving. The flexible tube thus manufactured is removed from the mandrel without difficulty. It is very elastic, and the "spring" effect is distinctive as is the dimensional indeformability because it returns instantaneously to its equilibrium position as soon as the mechanical stresses exerted on it in any directions are relaxed.

Its weight characteristics are as follows:

|  | Weight of the tube | Weight per m. |
| --- | --- | --- |
| Coated glass fabric | 7.0 g | 19.20 g |
| Stiffened hollow helix | 13.8 g | 37.80 g |
| Gluing of the sleeve | 1.1 g | 3.0 g |
| Gluing of the helix onto the fabric | 4.8 g | 13.10 g |
| Spraying of the elastomer in solution and as a solid | 15.6 g | 42.90 g |
| TOTALS | 42.3 g | 116.0 g |

EXAMPLE 4

The lathe described above and the mandrel (diameter = 50 mm, length = 600 mm) sheathed with a polytetrafluoroethylene film are used as in the preceding examples.

The stiffened helix used is that described in Example 1 and is a hollow braid of silicone glass fibres with an external diameter of 15/10 mm and a weight per metre of 2.33 g after the double coating with epoxy resin followed by polyimide resin.

A desized fabric of silicone glass of the poplin variety, of thickness 8/100 mm, weighing 87 g/m², is cut up in order to obtain a surface area of 355 mm × 170 mm. This fabric is identical to that of Example 1.

The covered mandrel is placed on the lathe. The surface area of fabric is placed in such a way that its length is parallel to the axis of the mandrel and that it overlaps on itself over a width of 5 mm along the upper generatrix of the mandrel.

The whole of the fabric is impregnated by means of a brush with a 25% strength solution, in toluene, of the crude elastomer which vulcanizes hot and was used in Example 1 for the same purpose. This dispersion asists the gluing of the edges to one another. The lathe is then started up and the solvent is driven off by blowing dry warm compressed air over it.

The covered mandrel is removed from the lathe and placed in an oven at 150°C for 10 minutes for vulcanization.

After cooling, the stiffened helix of length 36 cm is slipped over the vulcanized fabric. It is positioned by 2 insulating tapes at each end, after it has been made certain that the distance between turns is very uniformly 7 mm.

The whole is then put back on the lathe. The composition of the elastomer described in Example 1 used to manufacture a sheet of thickness 0.3 mm drawn off on the calender on a 50 micron film of polyethylene terephthalate, is used again, the 1.7 parts of a 50% strength by weight dispersion of 2,4-dichloro-benzoyl peroxide in a dimethylpolysiloxane oil of viscosity 1,000 cPo at 25°C being however replaced by 3 parts of the same dispersion. A 40% strength solution of this new composition in toluene is deposited very uniformly by means of a brush over the entire surface of the fabric covered with the helix, the lathe revolving at 15 revolutions/minute. The solvent is evaporated by blowing hot compressed air. The covered mandrel is then removed from the lathe and placed in a ventilated oven for 15 minutes at 150°C for vulcanization.

After cooling the covered mandrel and putting it back on the lathe, a second coating of the same solution is first dried in hot air and then vulcanized, like the first coating, for 15 minutes at 150°C.

After cooling, the 2 insulating tapes are taken off and the tube is removed from the mandrel without difficulty. Pressure variations of 200 millibars are applied to the tube [sealed at its two ends by aluminium discs glued with a one-component silicone elastomer which has been left to vulcanize for 48 hours] by means of pipes which pass through one of the discs, these pipes being equipped with stopcocks lubricated with a silicone grease. After ½ hour, it is found that there is no loss or gain in pressure.

The tube, which has an effective length of 355 mm and which contains 42 turns of stiffened braid, possesses a noteworthy "spring" effect, whilst deforming easily in all directions without changing its internal diameter. This property is due to its "wiriness" and applies despite a very small amount of elastomer deposited, as the following table shows:

|  | Weight of tube | Weight per m. |
|---|---|---|
| Fabric impregnated with the 25% strength solution of elastomer | 6.8 g | 19.1 g |
| Spiral of epoxide + polyimide stiffened hollow braid | 15.6 g | 43.9 g |
| Brush-coatings of the 40% strength solution of elastomer | 9.0 g | 25.3 g |
| TOTALS | 31.4 g | 88.3 g |

Furthermore, this tube fulfills the tests laid down by the abovementioned Standard Specifications NPRM 6930 and 6933.

We claim:

1. A lightweight fire-resistant flexible tube comprising at least one fabric woven from fibres of a material selected from the group consisting of glass, a rigid supporting helix glued to said fabric, the rigid helix being formed from a circular hollow braid of glass fibres, the braid having an external diameter of 0.8 to 1.8 mm, and being stiffened by a heat-resistant resin selected from the group consisting of organo-silicone resins and polyimide resins, the weight of heat resistant resin being from 5 to 35% of the weight of the braid.

2. A fire-resistant flexible tube as claimed in claim 1, and further comprising a solid core of mineral fibres within the circular hollow braid of said rigid helix, said mineral fibres being stiffened by a heat-resistant resin selected from the group consisting of organo-silicone resins and polyimide resins, the weight of heat resilient resin being from 5 to 35% of the weight of said mineral fibres.

3. A fire-resistant flexible tube as claimed in claim 1, comprising two woven fabrics, wherein one of said woven fabrics is surrounded by said rigid helix and the other of said woven fabrics surrounds said helix.

4. A fire-resistant flexible tube as claimed in claim 1, comprising a single woven fabric, wherein said woven fabric is surrounded by said supporting helix.

5. A fire-resistant flexible tube as claimed in claim 1, wherein the spacing between successive turns of the helix is between 2 and 8 mm.

6. A lightweight fire-resistant flexible tube comprising:

a first fabric woven from fibres of a material selected from the group consisting of glass, said fabric being formed into a tube, a rigid supporting helix glued about the external periphery of said first fabric, and a second fabric woven from fibres of a material selected from the group consisting of glass glued to said supporting helix and surrounding said helix and said first fabric, the rigid helix being formed from a circular hollow braid of glass fibres, the braid having an external diameter of 0.8 to 1.8 mm, and being stiffened by a heat-resistant resin selected from the group consisting of organo-silicone resins and polyimide resins; the weight of heat-resistant resin being from 10 to 20% of the weight of the braid.

7. A lightweight fire-resistant flexible tube comprising a first fabric woven from fibres of a material selected from the group consisting of glass, said fabric being formed into a tube, a rigid supporting helix glued about the external periphery of said first fabric, and a second fabric woven from fibres of a material selected from the group consisting of glass glued to said supporting helix and surrounding said first fabric and said supporting helix, said rigid helix being formed from a circular hollow braid of glass fibres, said braid having an external diameter of 0.8 to 1.8 mm, said braid being stiffened before being glued to said fabric by a heat-resistant resin selected from the group consisting of organo-silicone resins and polyimide resins, the weight of heat-resistant resin being from 10 to 20% of the weight of the braid.

8. A lightweight fire-resistant flexible tube comprising a first fabric woven from fibres of a material selected from the group consisting of glass, said fabric being formed into a tube, a rigid supporting helix glued to the external periphery of said fabric, and a second fabric woven from fibres of a material selected from the group consisting of glass, said fabric being glued to said helix and surrounding said helix and said first fabric, said rigid helix being formed from a circular hollow braid of glass fibres, the braid having an external diameter of 0.8 to 1.8 mm, said braid of glass fibres being initially nonrigid and being stiffened before being glued to said first fabric by a heat-resistant resin selected from the group consisting of organo-silicone resins and polyimide resins, the weight of heat-resistant resin being from 15 to 25% of the weight of the braid.

* * * * *